United States Patent
Tebbe

(10) Patent No.: US 10,320,514 B2
(45) Date of Patent: Jun. 11, 2019

(54) METHOD AND APPARATUS FOR REDUCING PREAMBLE LENGTH IN PASSIVE OPTICAL NETWORK (PON) SYSTEMS

(71) Applicant: Roy B. Tebbe, Raleigh, NC (US)

(72) Inventor: Roy B. Tebbe, Raleigh, NC (US)

(73) Assignee: Nokia of America Corporation, Murray Hill, NJ (US)

( * ) Notice: Subject to any disclaimer, the term of this patent is extended or adjusted under 35 U.S.C. 154(b) by 81 days.

(21) Appl. No.: 15/583,206

(22) Filed: May 1, 2017

(65) Prior Publication Data
US 2018/0316456 A1    Nov. 1, 2018

(51) Int. Cl.
*H04J 14/02* (2006.01)
*H04B 17/318* (2015.01)
*H04L 12/863* (2013.01)
*H04Q 11/00* (2006.01)

(52) U.S. Cl.
CPC ........ *H04J 14/0235* (2013.01); *H04B 17/318* (2015.01); *H04L 47/623* (2013.01); *H04Q 11/0067* (2013.01)

(58) Field of Classification Search
CPC .............. H04J 14/0235; H04J 14/0282; H04B 17/318; H04B 10/2587; H04B 10/807; H04B 10/272; H04L 47/623; H04Q 11/0067
See application file for complete search history.

(56) References Cited

U.S. PATENT DOCUMENTS

| | | | |
|---|---|---|---|
| 7,477,845 B2 | 1/2009 | Kramer | |
| 7,865,088 B2 | 1/2011 | Dalton | |
| 8,041,216 B2 | 10/2011 | de Lind van Wijngaarden | |
| 8,326,152 B2 | 12/2012 | Van Veen et al. | |
| 8,849,121 B2 | 9/2014 | In De Betou et al. | |
| 9,066,164 B2 | 6/2015 | In De Betou et al. | |
| 2008/0253777 A1* | 10/2008 | Delve | H04L 25/03019 398/208 |
| 2011/0255866 A1* | 10/2011 | Van Veen | H04B 10/07955 398/35 |
| 2014/0233944 A1* | 8/2014 | Vetter | H04J 14/0282 398/34 |

* cited by examiner

*Primary Examiner* — Ted M Wang
(74) *Attorney, Agent, or Firm* — Harness, Dickey & Pierce, P.L.C.

(57) ABSTRACT

A method of handling upstream data transmissions in a passive optical network includes determining signal power levels of a plurality of optical network units (ONUs); and scheduling transmissions of upstream data bursts of the plurality of ONUs by, assigning each of the upstream data bursts to one of two or more data burst groups based on the determined signal power levels, and selecting time intervals during which the upstream data bursts are transmitted in accordance with the two or more data burst groups such that the two or more data burst groups are scheduled to be transmitted sequentially.

18 Claims, 8 Drawing Sheets

METHOD AND APPARATUS FOR REDUCING PREAMBLE LENGTH IN PASSIVE OPTICAL NETWORK (PON) SYSTEMS

BACKGROUND

1. Field

Example embodiments relate generally passive optical network (PON) systems, and particularly to scheduling upstream data transmissions in a PON.

2. Related Art

Fiber-optic communication networks may be used, for example, as access networks connecting a core network structure with individual users. One such access network is a passive optical network (PON). A PON typically uses a point-to-multipoint topology, with a central office node, for example an optical line terminal (OLT), communicating with numerous user side devices, for example, optical network units (ONUs) or optical network terminals (ONTs), over a communications network (e.g., an optical distribution network (ODN)).

A PON may perform upstream and downstream transmissions using different wavelengths such that the upstream and downstream transmissions do not interfere with each other. Downstream transmissions are sent to all or many devices. However, in the upstream direction, i.e., data transmitted from one of the subscribers to the exchange, data packets transmitted from the subscriber may experience packet collisions, if two or more ONTs are transmitting upstream data simultaneously to the OLT. In order to reduce the probability of (or, alternatively, prevent) these packet collisions, the ONTs may use PON burst-mode technology to burst the data packets upstream at relatively high bit rates by utilizing time-division multiple access (TDMA) to multiplex the data packets with data transmitted from other subscribers.

SUMMARY

According to at least some example embodiments, a method of handling upstream data transmissions in a passive optical network includes determining signal power levels of a plurality of optical network units (ONUs); and scheduling transmissions of upstream data bursts of the plurality of ONUs by, assigning each of the upstream data bursts to one of two or more data burst groups based on the determined signal power levels, and selecting time intervals during which the upstream data bursts are transmitted in accordance with two or more data burst groups such that the two or more data burst groups are scheduled to be transmitted sequentially.

The scheduling of the transmissions of the upstream data bursts may include scheduling of the transmissions of the upstream data bursts such that a length of an intra-group preamble is different than a length of an inter-group preamble, the intra-group preamble being a preamble in between each consecutive pair of data bursts, from among the upstream data bursts, that have been assigned to a same group, from among the two or more groups, the inter-group preamble being a preamble in between each consecutive pair of data burst groups, from among the two or more data burst groups.

The length of the intra-group preamble may be less than the length of the inter-group preamble.

The determining of the signal power levels of the plurality of ONUs may include sending ranging requests to the plurality of ONUs; receiving ranging responses from the plurality of ONUs; and measuring signal power levels of the received ranging responses.

The determining of the signal power levels of the plurality of ONUs may further include for each ONU among the plurality of ONUs, determining the signal power level of the ONU to be the measured signal power level of the ranging response received from the ONU.

The measuring of the signal power levels of the received ranging responses may be based on received signal strength indicators (RSSIs) of the received ranging responses.

The assigning may include determining an initial ONU from among the plurality of ONUs; determining one or more other ONUs from among the plurality of ONUs, the one or more other ONUs being ONUs, from among the plurality of ONUs, whose determined signal power levels differ from the determined signal power level of the initial ONU by less than a threshold amount; and assigning the data bursts, from among the upstream data bursts, of the initial ONU and the one or more other ONUs to a same data burst group, from among the two or more data burst groups.

The determining of the initial ONU may include determining, for each ONU among the plurality of ONUs, a priority category to which the ONU belongs; and determining, as the initial ONU, an ONU, from among the plurality of ONUs, that belongs to a highest priority category from among the plurality of priority categories.

The method may further include controlling at least one ONU, from among the plurality of ONUs, to transmit a null packet during a timeslot following a timeslot in which the at least one ONU transmits an upstream data packet.

The null packet may be an unmodulated signal including all logical 1 values or all logical 0 values.

According to at least some example embodiments, a passive optical network (PON) element includes memory storing computer-executable instructions; and one or more processors configured to execute the computer-executable instructions such that the one or more processors are configured to, determine signal power levels of a plurality of optical network units (ONUs); and schedule transmissions of upstream data bursts of the plurality of ONUs by, assigning each of the upstream data bursts to one of two or more data burst groups based on the determined signal power levels, and selecting time intervals during which the upstream data bursts are transmitted in accordance with the two or more data burst groups such that the two or more data burst groups are scheduled to be transmitted sequentially.

The one or more processors may be configured to execute the computer-executable instructions such that the scheduling of the transmissions of the upstream data bursts includes scheduling of the transmissions of the upstream data bursts such that a length of an intra-group preamble is different than a length of an inter-group preamble, the intra-group preamble being a preamble in between each consecutive pair of data bursts, from among the upstream data bursts, that have been assigned to a same group, from among the two or more data burst groups, the inter-group preamble being a preamble in between each consecutive pair of data burst groups, from among the two or more data burst groups.

The one or more processors may be configured to execute the computer-executable instructions such that the length of the intra-group preamble is less than the length of the inter-group preamble.

The one or more processors may be configured to execute the computer-executable instructions such that the determining of the signal power levels of the plurality of ONUs includes sending ranging requests to the plurality of ONUs; receiving ranging responses from the plurality of ONUs; and measuring signal power levels of the received ranging responses.

The one or more processors may be configured to execute the computer-executable instructions such that the determining of the signal power levels of the plurality of ONUs further includes for each ONU among the plurality of ONUs, determining the signal power level of the ONU to be the measured signal power level of the ranging response received from the ONU.

The one or more processors may be configured to execute the computer-executable instructions such that the measuring of the signal power levels of the received ranging responses is based on received signal strength indicators (RSSIs) of the received ranging responses.

The one or more processors may be configured to execute the computer-executable instructions such that the assigning includes determining an initial ONU from among the plurality of ONUs; determining one or more other ONUs from among the plurality of ONUs, the one or more other ONUs being ONUs, from among the plurality of ONUs, whose determined signal power levels differ from the determined signal power level of the initial ONU by less than a threshold amount; and assigning the data bursts, from among the upstream data bursts, of the initial ONU and the one or more other ONUs to a same data burst group, from among the two or more data burst groups.

The one or more processors may be configured to execute the computer-executable instructions such that the determining of the initial ONU includes determining a plurality of priority categories corresponding to the plurality of ONUs by determining, for each ONU among the plurality of ONUs, a priority category to which the ONU belongs; and determining, as the initial ONU, an ONU, from among the plurality of ONUs, that belongs to a highest priority category from among the plurality of priority categories.

The one or more processors may be configured to execute the computer-executable instructions such that the one or more processors are further configured to, control at least one ONU, from among the plurality of ONUs, to transmit a null packet during a timeslot following a timeslot in which the at least one ONU transmits an upstream data packet.

The null packet may be an unmodulated signal including all logical 1 values or all logical 0 values.

From time to time an ONU may fail to send its assigned upstream burst. Due to the short preamble time used this may not allow the OLT to properly recover a subsequent burst. At least some example embodiments provide for various methods to handle a missing burst. Including directing another ONU, within the same burst group, to simultaneously burst during the same timeslot sending a null packet (either all logical '1' or logical '0' values), thereby maintaining the circuitry within the optics module at the current gain setting of the previous ONU burst value. Alternatively the OLT directs the optics module to disable Automatic gain control forcing the Receive gain setting to remain at the level of the previous burst. Another method is to simply allow the failure of the next burst by doing nothing, this could be implemented for low priority traffic.

BRIEF DESCRIPTION OF THE DRAWINGS

At least some example embodiments will become more fully understood from the detailed description provided below and the accompanying drawings, wherein like elements are represented by like reference numerals, which are given by way of illustration only and thus are not limiting of example embodiments and wherein.

DETAILED DESCRIPTION OF EXAMPLE EMBODIMENTS

Figure 1A:
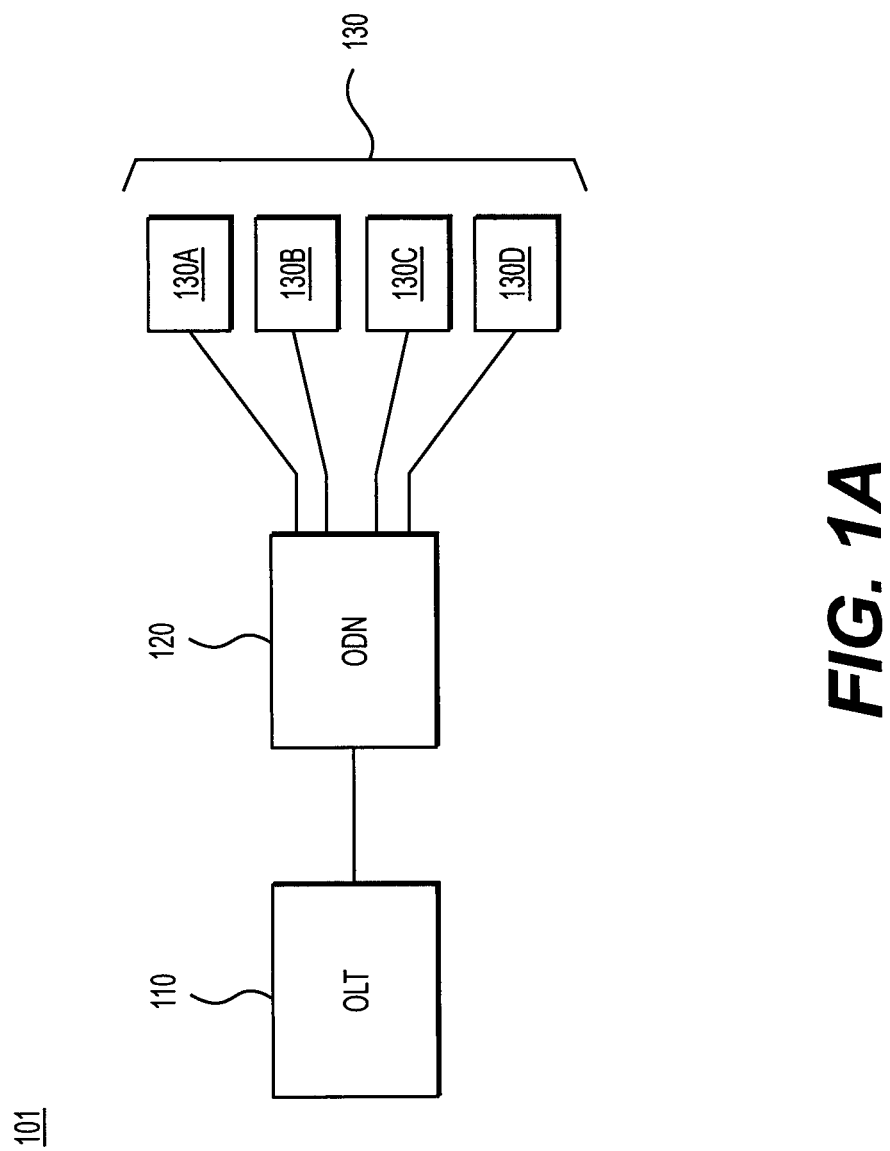
FIG. 1A is a diagram illustrating a portion of a passive optical network (PON) according to one or more example embodiments.

Various example embodiments will now be described more fully with reference to the accompanying drawings in which some example embodiments are shown.

Detailed illustrative embodiments are disclosed herein. However, specific structural and functional details disclosed herein are merely representative for purposes of describing at least some example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of example embodiments. Like numbers refer to like elements throughout the description of the figures. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Exemplary embodiments are discussed herein as being implemented in a suitable computing environment. Although not required, exemplary embodiments will be described in the general context of computer-executable instructions, such as program modules or functional processes, being executed by one or more computer processors or CPUs. Generally, program modules or functional processes include routines, programs, objects, components, data structures, etc. that performs particular tasks or implement particular abstract data types.

The program modules and functional processes discussed herein may be implemented using existing hardware in existing communication networks. For example, program modules and functional processes discussed herein may be implemented using existing hardware at existing network elements or control nodes (e.g., an optical line terminal (OLT) or optical network unit (ONU) illustrated in FIG. 1A). Such existing hardware may include one or more digital signal processors (DSPs), application-specific-integrated-circuits (ASICs), field programmable gate arrays (FPGAs) computers or the like.

In the following description, illustrative embodiments will be described with reference to acts and symbolic representations of operations (e.g., in the form of flowcharts) that are performed by one or more processors, unless indicated otherwise. As such, it will be understood that such acts and operations, which are at times referred to as being computer-executed, include the manipulation by the processor of electrical signals representing data in a structured form. This manipulation transforms the data or maintains it at locations in the memory system of the computer, which reconfigures or otherwise alters the operation of the computer in a manner well understood by those skilled in the art.

Example Network Architecture

FIG. 1A is a diagram illustrating a portion of a passive optical network (PON) 101 according to one or more example embodiments. PON 101 includes an optical line terminal (OLT) 110, an optical distribution network (ODN) 120, and a plurality of optical network units (ONUs) 130. ONUs 130 may include a first ONU 130A, a second ONU 130B, a third ONU 130C, and a fourth ONU 130D.

Example protocols the PON 101, OLT 110, ODN 120 and ONUs 130 may follow include, but are not limited to, a gigabit-capable PON (GPON) protocol, a 10-Gigabit-capable PON (XG-PON) protocol, a 40-Gigabit-capable PON (NG-PON2), and 10-gigabit-capable symmetric PON (XGS-PON). GPON, XG-PON, NG-PON2, and XGS-PON protocols are described, for example, in International Telecommunication Union (ITU) Telecommunication Standardization Sector (ITU-T) Recommendations G series G.984 (e.g., G.984.1-G.984.7), G.987 (e.g., G.987.1-G.987.4), G.989 (e.g., G.989.1-G.989.3), and G.9807, respectively.

Other example protocols the PON 101, OLT 110, ODN 120 and ONUs 130 may follow include ATM-PON, Broadband PON (BPON) (defined by ITU-T Recommendations G series G.983), Ethernet-PON (EPON) (defined by the Institute of Electrical and Electronics Engineers (IEEE) 802.3 standard) and 10-Gigabit Ethernet PON (10G-EPON) (defined by the IEEE 802.3av standard).

According to at least some example embodiments, the OLT 110 controls a flow of data in the PON 101 with respect to both upstream and downstream directions by performing operations including scheduling of upstream and downstream data transmissions in the PON 101. Upstream data is sent from one or more of the ONUs 130 to the OLT 110 via the ODN 120. Downstream data is sent from the OLT 110 to one or more of the ONUs 130 via the ODN 120. According to at least some example embodiments, the OLT 110 may be located in a central office of an operator of the PON 101. Though, for the purpose of simplicity, only one OLT is illustrated in FIG. 1A, the PON 101 may include more than one OLT in accordance with the needs and/or desires of an operator and/or designer of the PON 101.

The ODN 120 is connected to the OLT 110 and each of the ONUs 130. The ODN 120 serves as a transmission medium over which upstream and downstream transmissions are sent between the OLT 110 and ONUs 130. The ODN 120 may include components arranged in accordance with known structures of ODNs. For example, according to at least some example embodiments, the ODN 120 may include components for supporting optical data transmission including fiber optic connectors, optical fibers, and passive optical splitters. Further, in accordance with known structures of ODNs, the ODN 120 may include, for example, feeder fiber, distribution fiber, drop fiber, at least one optical distribution point, and at least one optical access point.

The ONUs 130 may each convert optical signals received at the ONUs 130 from the ODN 120 into electrical signals, and transmit the electrical signals to devices of end-users (i.e., subscribers or customers of one or more services provided via the PON 101). Further, the ONUs 130 may each convert electrical signals (e.g., electrical signals received from devices of end-users) into optical signals, and transmit the optical signals to the OLT 110 via the ODN 120 using, for example, transmitting lasers included in each of the ONUs 130, respectively. Each of the ONUs 130 may be located on the client side of the PON 101, for example, in or near the sites or buildings where end-users served by the ONUs 130 are located. According to at least some example embodiments, one example of an ONU is an optical network terminal (OLT). Though, for the purpose of simplicity, only four of the ONUs 130 (i.e., first through fourth ONUs 130A-130D) are illustrated in FIG. 1A, the ONUs 130 may include any number of ONUs in accordance with the protocol(s) the PON 101 follows and the needs and/or desires of an operator and/or designer of the PON 101.

Example Network Element Structure

Figure 1B:
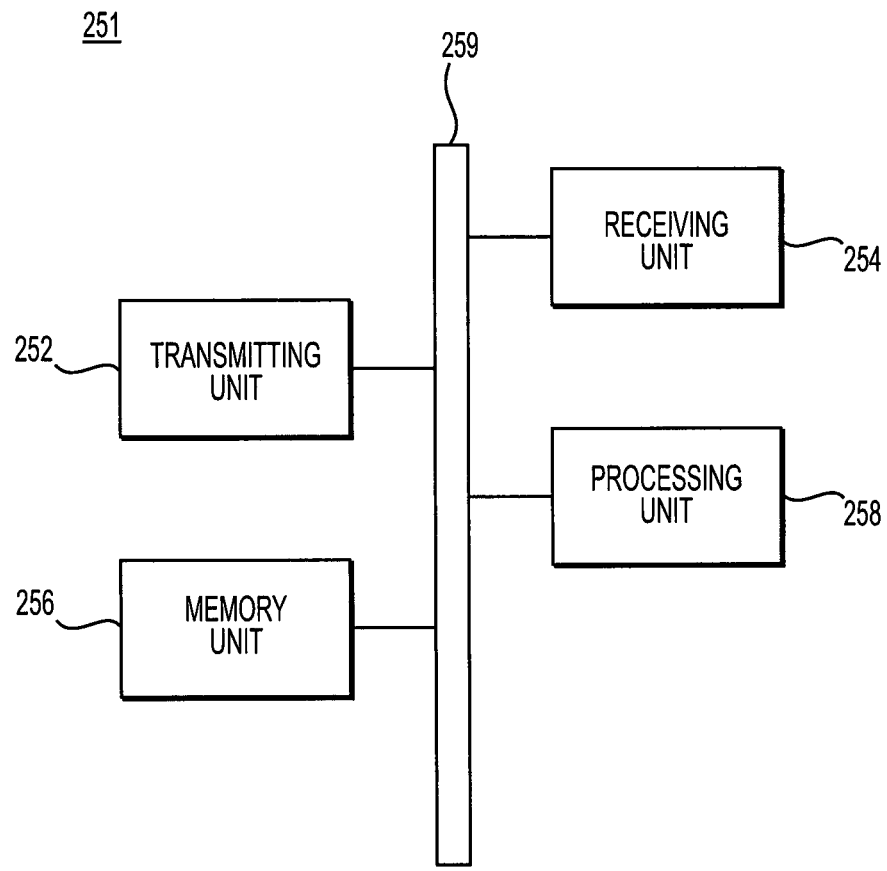
FIG. 1B is a diagram illustrating an example structure of a network element according to one or more example embodiments.

FIG. 1B is a diagram illustrating an example structure of a network element 251. According to example embodiments, any or all network elements in the PON 101, including for example the OLT 110 and each of the ONUs 130, may include the structure, and perform the operations, described below with respect to network element 251.

Referring to FIG. 1B, the network element 251 may include, for example, a data bus 259, a transmitting unit 252, a receiving unit 254, a memory unit 256, and a processing unit 258.

The transmitting unit 252, receiving unit 254, memory unit 256, and processing unit 258 may send data to and/or receive data from one another using the data bus 259.

The transmitting unit 252 is a device that includes hardware and any necessary software for transmitting signals including, for example, control signals or data signals via one or more wired and/or wireless connections to other network elements in the PON 101.

The receiving unit 254 is a device that includes hardware and any necessary software for receiving signals including, for example, control signals or data signals via one or more wired and/or wireless connections to other network elements in the in the PON 101.

The memory unit 256 may be any device capable of storing data including magnetic storage, flash storage, etc.

The processing unit 258 may be, for example, a processor. The term 'processor,' as used in the present disclosure, may refer to, for example, a hardware-implemented data processing device having circuitry that is physically structured to execute desired operations including, for example, operations represented as code and/or instructions included in a program. Examples of the above-referenced hardware-implemented data processing device include, but are not limited to, a microprocessor, a central processing unit (CPU), a processor core, a multi-core processor; a multi-processor, an application-specific integrated circuit (ASIC), and a field programmable gate array (FPGA). Processors executing program code are programmed processors, and thus, are special-purpose computers.

Figure 2:
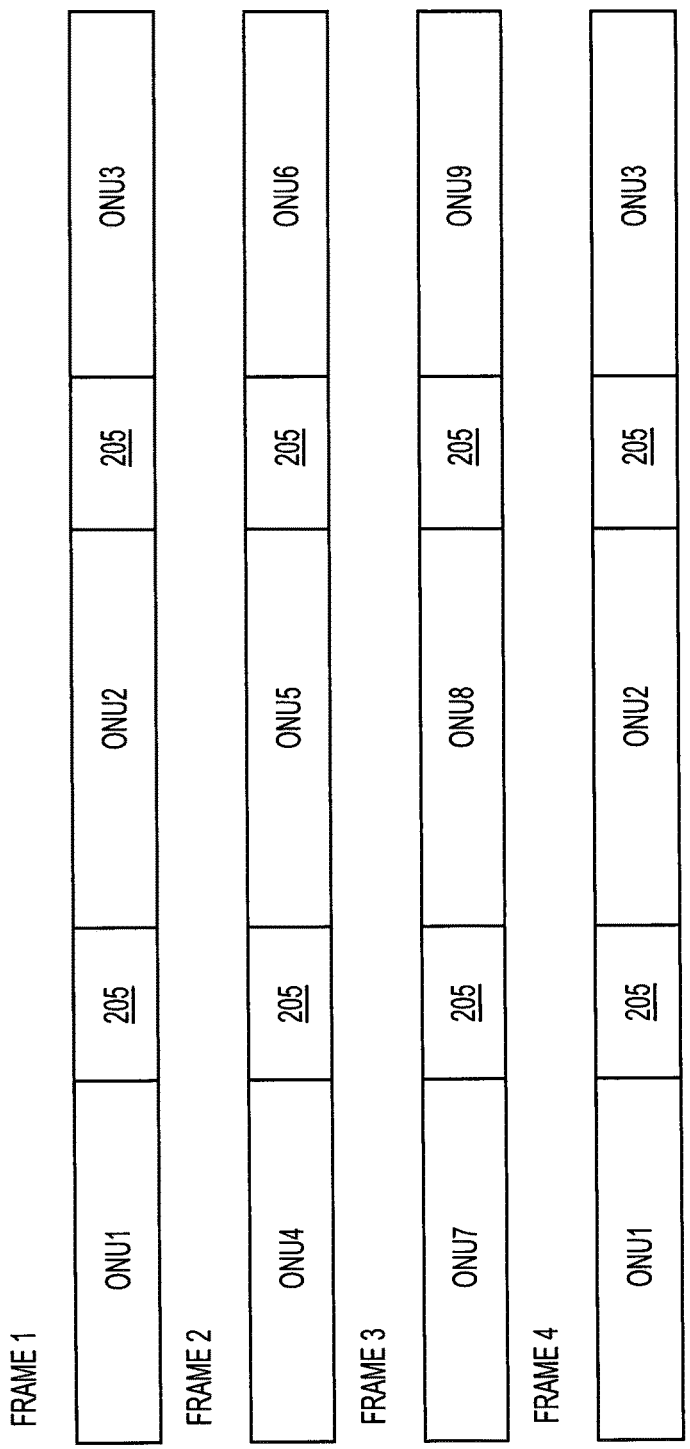
FIG. 2 is a diagram illustrating an example schedule of optical network unit (ONU) data bursts.

According to at least one example embodiment, any operations described herein, for example with reference to any of FIGS. 1A-6, as being performed by an OLT (e.g., OLT 110) or an ONU (e.g., ONUs 130) may be performed by an electronic device having the structure of the network element 251 illustrated in FIG. 2B. For example, according to at least one example embodiment, the network element 251 may be programmed, in terms of software and/or hardware, to perform any or all of the functions described herein as being performed by an OLT or ONU. Consequently, each of the OLT and ONUs described herein may be embodied by a device that includes a special purpose computer.

Examples of the network element 251 being programmed, in terms of software, to perform any or all of the functions described herein as being performed by an OLT or ONU described herein will now be discussed below. For example, the memory unit 256 may store a program including executable instructions corresponding to any or all of the operations described herein (e.g., with reference FIGS. 1-6) as being performed by a by an OLT or ONU. According to at least one example embodiment, additionally or alternatively to being stored in the memory unit 256, the executable instructions may be stored in a computer-readable medium including, for example, an optical disc, flash drive, SD card, etc., and the network element 251 may include hardware for reading data stored on the computer readable-medium. Further, the processing unit 258 may be a processor configured to perform any or all of the operations described herein as being performed by an OLT or ONU, for example, by reading and executing the executable instructions stored in at least one of the memory unit 256 and a computer readable storage medium loaded into hardware included in the network element 251 for reading computer-readable mediums.

Examples of the network element 251 being programmed, in terms of hardware, to perform any or all of the functions described herein as being performed by an OLT or ONU will now be discussed below. In addition to, or as an alternative to, executable instructions corresponding to the functions described herein as being performed by a OLT or ONU being stored in a memory unit or a computer-readable medium as is discussed above, the processing unit 258 may include a circuit that has a structural design dedicated to performing any or all of the operations described herein as being performed by an OLT or ONU. For example, the above-referenced circuit included in the processing unit 258 may be a FPGA or ASIC physically programmed to perform any or all of the operations described herein as being performed by an OLT or ONU.

An overview of ONU data burst scheduling according to example embodiments will now be discussed below.

Overview of Upstream ONU Data Burst Scheduling

If multiple ONUs attempt to transmit upstream data to the OLT 110 at the same time in the PON 101, collisions may occur and upstream data may be lost or degraded. Thus, in the PON 101, the OLT 110 schedules the upstream data bursts of ONUs that have upstream data to transmit such that an occurrence of multiple ONUs transmitting upstream data to the OLT 110 at the same time is reduced or, alternatively, eliminated. By scheduling the upstream data bursts, data collisions, which may result in upstream data being degraded or lost, are reduced or, alternatively, prevented.

FIG. 2 is a diagram illustrating an example schedule of ONU data bursts. FIG. 2 shows data bursts of first through ninth ONUs ONU1-ONU9. First through ninth ONUs ONU1-ONU9 may be included in the ONUs 130. For example, the first ONU 130A, second ONU 130B, third ONU 130C and fourth ONU 130D may also be referred to, herein, as ONU1, ONU2, ONU3, and ONU4, respectively.

As is illustrated in FIG. 2, time intervals for upstream ONU data bursts may be divided into frames. FIG. 2 illustrates four frames, Frame 1-Frame 4. Temporally, Frame 2 follows Frame 1, Frame 3 follows Frame 2, and Frame 4 follows Frame 3. As is illustrated in the schedule shown in FIG. 2, in Frame 1, ONU 1 is scheduled to transmit an upstream data burst to the OLT 110 first, ONU 2 is scheduled to transmit an upstream data burst to the OLT 110 second, and ONU 3 is scheduled to transmit an upstream data burst to the OLT 110 third. As is shown in FIG. 2, ONUs 4-9 are sequentially scheduled to transmit respective upstream data bursts to the OLT 110 in Frame 2 and Frame 3. As is also shown in FIG. 2, ONUs 4-9 are sequentially scheduled to transmit respective upstream data bursts to the OLT 110, again, in Frame 4. As is illustrated in FIG. 2, a guard time 205 exists between the consecutive upstream ONU data bursts of each of Frames 1-4.

Figure 3:
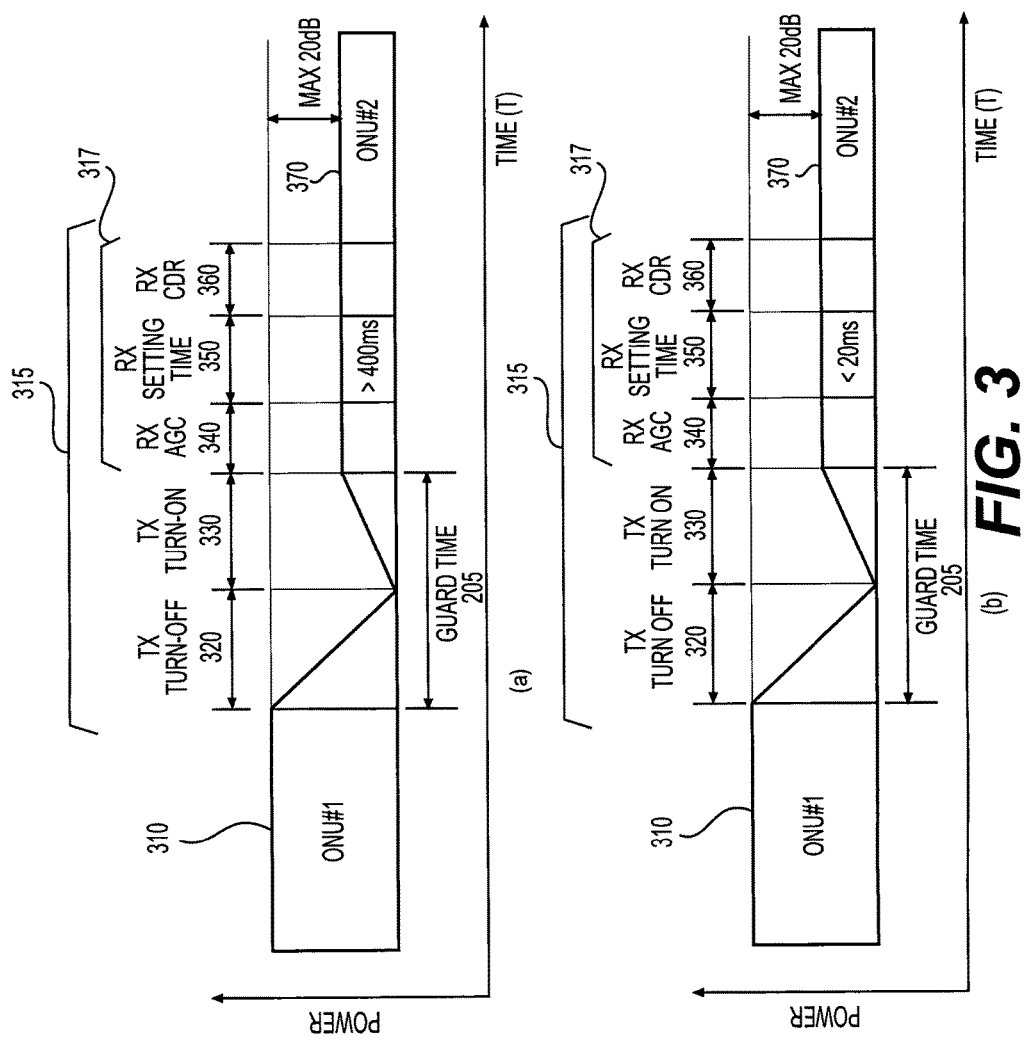
FIG. 3 is a diagram for explaining an example of overhead between ONU data bursts according to one or more example embodiments.

FIG. 3 is a diagram for explaining an example of overhead between ONU data bursts according to one or more example embodiments. Item (a) in FIG. 3 shows relative power levels of optical signals received at the OLT 110 from ONU 1 and ONU 2 over time, when ONU 2 is scheduled to transmit an upstream data burst, sequentially, after ONU 1. FIG. 3 illustrates timings and power levels of a first payload 310 and a second payload 370. The first payload 310 is a payload of an upstream data burst transmitted by the ONU 1 and the second payload 370 is a payload of an upstream data burst transmitted by the ONU 2.

As is shown in FIG. 3, between a first payload 310 and a second payload 370 is a burst overhead 315. The burst overhead 315 includes the guard time 205 and a preamble 317. The guard time 205 includes a transmitter (Tx) turn-off time 320 and a Tx turn-on time 330. The Tx turn-off time 320 indicates the duration of the operation of turning ONU 1's transmitting laser off, and the Tx turn-on time 330 indicates the duration of the operation of turning ONU 2's transmitting laser on. According to at least some example embodiments, during the preamble 317, the ONU 2 transmits a one-zero pattern throughout the duration of the preamble 317. The preamble 317 includes a receiver (Rx) automatic gain control (AGC) time 340, Rx settling time 350, and Rx clock/data recovery (CDR) time 360. The Rx AGC time 340 indicates a duration of an AGC operation performed by Rx equipment of the OLT 110. The Rx settling time 350 indicates a duration of an operation of Rx equipment (e.g., a burst-mode transimpedance amplifier (TIA), a burst-mode limiting amplifier (LIA), and/or capacitors) of the OLT 110 adjusting to the input power difference between the previous input power of ONU 1's data burst and the input power of ONU 2's data burst. In the examples shown in FIG. 3, the power difference is a maximum of 20 decibels-milliwatt (dBm or simply dB).

The duration of the burst overhead 315 is a period of time over which no meaningful data (i.e., payload data) is sent to the OLT 110 from the ONUs 130. The duration of the preamble 317 is a period of time over which the ONU 2 could send meaningful data to the OLT 110, but does not because the OUT 110 may not have yet adjusted to the changed input power level on the upstream data burst of the ONU 2. Further, without performing the above-referenced adjustments, the OLT 110 may not be able to reliably and accurately acquire the payload data transmitted in the upstream data burst of the ONU 2. If a length of the preamble 317 is reduced, the length of the burst overhead 315 will also be reduced, thus increasing the achievable bandwidth of upstream data transmissions in the PON 101 by increasing the ratio between (i) the amount of time during which payload data can be accurately and reliably received at the OLT 110 from an ONU, and (ii) the amount time during which payload data cannot be accurately and reliably received at the OLT 110 from an ONU.

One example manner in which the preamble 317 can be reduced is by implementing an optical reset operation. The optical reset operation includes centering the Rx equipment of the OLT 110 by preparing (i.e., adjusting) the Rx equipment, between upstream ONU data bursts, to receive an input power level having a central, default value. The optical reset operation can reduce the Rx setting time 350. For example, item (a) of FIG. 3 discussed above is an example in which the optical reset operation is not implemented, and the Rx settling time 350 may be, for example, 400 nanoseconds (ns) or greater. Further, item (b) of FIG. 3 is an example in which the optical reset operation is implemented, and the Rx settling time 350 may be, for example, 100 nanoseconds (ns) or less.

However, according to at least some example embodiments, even greater reductions in the length of the preamble 317 may be achieved by determining power levels of signals transmitted from ONUs, grouping the ONUs such that ONUs having similar relative signal power levels are included in the same group, and scheduling upstream ONU data bursts in accordance with the grouping.

A method of reducing preamble lengths of upstream ONU data bursts according to one or more example embodiments will now be discussed in greater detail below with reference to FIGS. 4-6.

Figure 4:
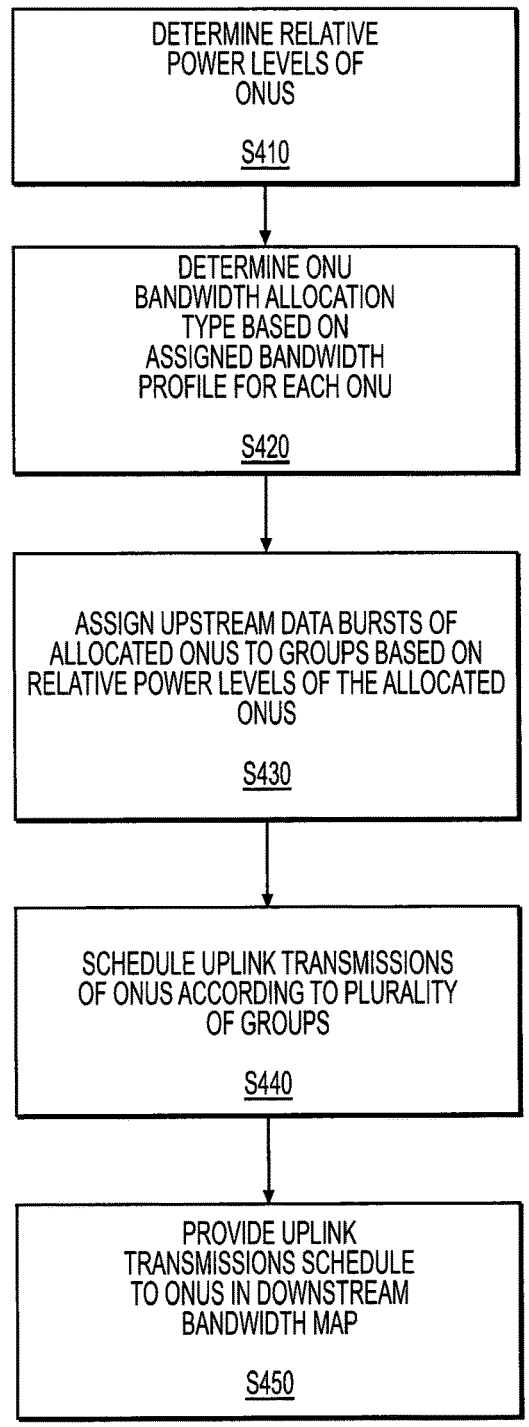
FIG. 4 is a flow chart illustrating a method of reducing preamble lengths of upstream ONU data bursts according to one or more example embodiments.

Example Method of Reducing Preamble Lengths of Upstream ONU Data Bursts According to One or More Example Embodiments FIG. 4 is a flow chart illustrating a method of reducing preamble lengths of upstream ONU data bursts according to one or more example embodiments. For the purpose of simplicity, the example method of FIG. 4 will be explained with reference, primarily, to a scenario in which the OLT 110 is scheduling upstream data bursts of first through fourth ONUs ONU1-ONU4. However, according to at least some example embodiments, the OLT 110 is not limited to performing upstream data burst scheduling with respect to only four ONUs, and the OLT 110 can perform the scheduling with respect to fewer than four ONUs or more than four ONUs.

Referring to FIG. 4, in operation S410, relative power levels of ONUs are determined. For example, according to at least some example embodiments, in operation S410, the OLT 110 determines relative power levels of upstream optical signals of some or all of the ONUs 130. Using the first ONU ONU 1 as an example, according to at least some example embodiments, in operation S410, the OLT 110 may measure a relative signal power level of an optical signal transmitted from the first ONU ONU 1 to the OLT 110, and determine the relative signal power level of the first ONU ONU 1 to be the measured relative signal power level of the optical signal transmitted by the first ONU ONU 1. The OLT 110 may perform the same operations discussed above with respect to the first ONU ONU 1 for any ONU among the ONUs 130 including, for example, second through fourth ONUs ONU2-ONU 4.

According to at least some example embodiments, in operation S410, the OLT 110 may perform received signal strength indicator (RSSI) measurements on optical data received from first through fourth ONUs ONU 1-ONU 4 in order to determine relative power levels of optical signals received from the first through fourth ONUs ONU 1-ONU 4. According to at least some example embodiments of the inventive concepts, the OLT 110 may measure relative signal power levels of the first through fourth ONUs ONU 1-ONU 4 by determining the RSSIs of the first through fourth ONUs ONU 1-ONU 4 during a ranging period.

For example, in accordance with known methods, during or prior to performing operation S410, the OLT 110 may perform a ranging process by sending ranging requests to each of the first through fourth ONUs ONU 1-ONU 4, receiving ranging responses from the first through fourth ONUs ONU 1-ONU 4, respectively, and using the ranging responses to measure a round trip time (RTT) for each of the first through fourth ONUs ONU 1-ONU 4. According to at least some example embodiments, the OLT 110 may measure relative signal power levels of optical signals of the ranging responses received from the first through fourth ONUs ONU 1-ONU 4 during the ranging operation, in order to determine the relative signal powers of the first through fourth ONUs ONU 1-ONU 4. After operation S410, the OLT 110 may proceed to operation S420.

In operation S420, the OLT 110 determines how much upstream bandwidth to allocate to each individual ONU that has been recognized during the ranging process, based on a bandwidth profile of each individual ONU. Further, the OLT 110 allocates bandwidth to each of the ONUs that were recognized by the OLT 110 during the ranging process performed in operation S410, based on the amount of bandwidth determined for each ONU. According to at least some example embodiments, the bandwidth profile of each ONU may be a predefined assigned bandwidth profile. For each ONU, the bandwidth profile of the ONU may contain priority (e.g., High/medium/low) information, an indication of whether the bandwidth assigned is fixed or adjustable, and an indication of how often the ONU will send bursts (e.g. once every frame, or once every 8 frames). As used in the present disclosure, the term "allocated ONU" refers to an ONU to which upstream bandwidth has been allocated (e.g., by the OLT 110).

In operation S430, upstream data bursts corresponding, respectively, to allocated ONUs are assigned to groups based on relative signal power levels of the allocated ONUs. The OLT 110 may use the relative signal power levels determined in operation S410 to arrange the upstream data bursts of the allocated ONUs into upstream data burst groups, as is discussed in greater detail below with reference to FIG. 5.

Figure 5:
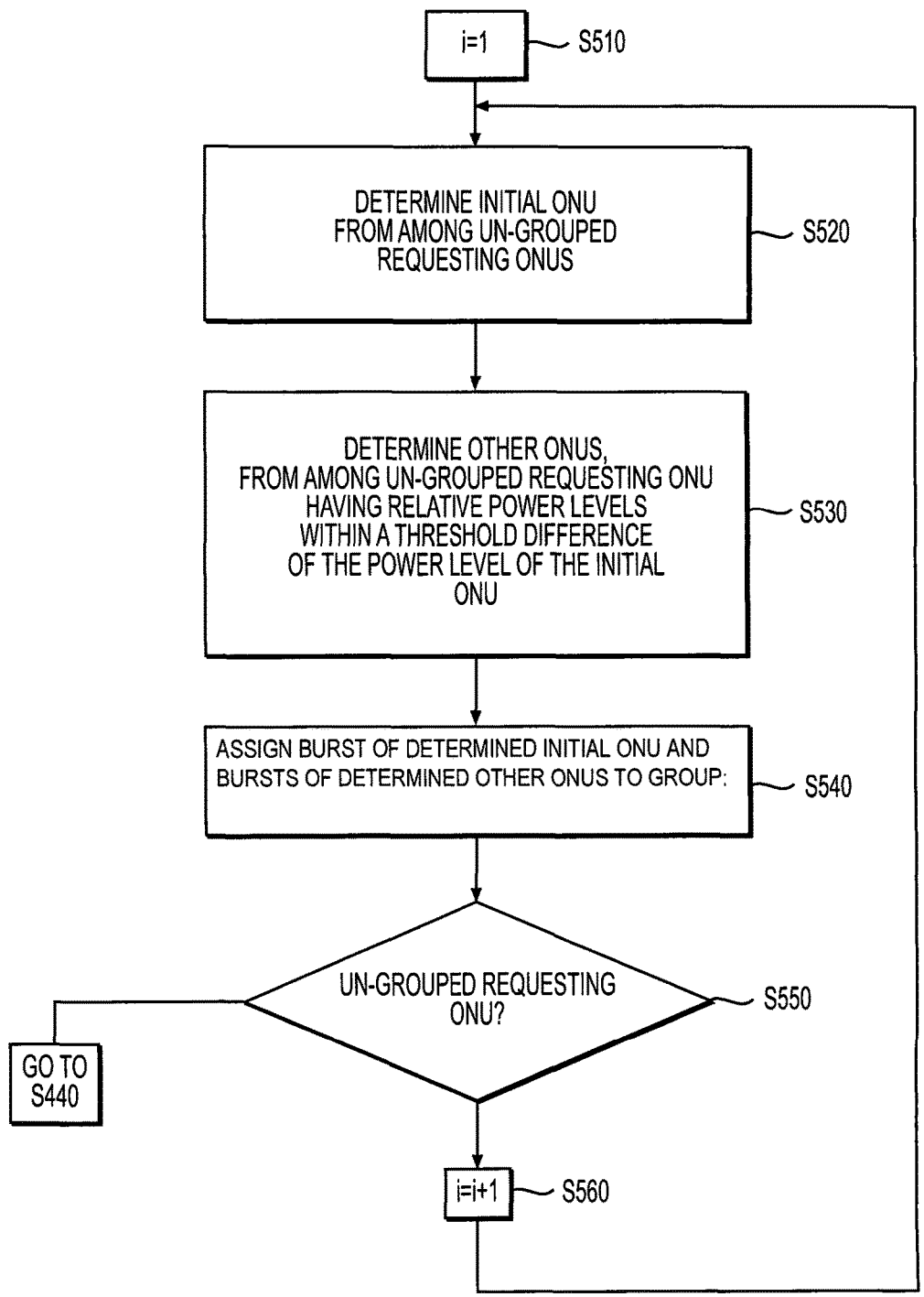
FIG. 5 is a flow chart illustrating a method of grouping the upstream ONU data bursts based on relative signal power levels of corresponding ONUs according to one or more example embodiments.

FIG. 5 is a flow chart illustrating a method of grouping upstream data bursts based on relative signal power levels of corresponding ONUs according to one or more example embodiments. According to at least some example embodiments, the method illustrated in FIG. 5 is an example of operation S430 of FIG. 4. Referring to FIG. 5, in operation S510, the OLT 110 initializes an index value i by setting index value i to 1, and the OLT 110 proceeds to operation S520.

In operation S520, the OLT 110 determines an initial ONU from among un-grouped ONUs. Each un-grouped ONU is an allocated ONU whose upstream data burst has not yet been assigned to an upstream data burst group by the OLT 110. According to at least some example embodiments, in operation S520, the OLT 110 may choose the un-grouped ONU having a highest priority level among the un-grouped ONUs as the initial ONU. For example, an operator and/or designer of the PON 101 may assign each of the ONUs 130 into one of a plurality of different priority categories, for example, based on the groups or classes of subscribers each ONU serves. Further, the OLT 110 may choose the un-grouped ONU (or, one of the un-grouped ONUs) assigned to the highest priority category among the un-grouped ONUs as the initial ONU. As another example, the upstream data bursts that the un-grouped ONUs intend to transmit to the OLT 110 may each have a corresponding priority level, and the OLT 110 may choose, as the initial ONU, the ONU corresponding to the upstream data burst having the highest priority level among the upstream data bursts each of the un-grouped ONUs intend to transmit. According to at least some example embodiments, the OLT 110 may choose the un-grouped ONU having the lowest relative signal power level among the un-grouped ONUs as the initial ONU. After determining the initial ONU in operation S520, the OLT 110 may proceed to operation S530.

In operation S530, the OLT 110 determines one or more other ONUs. The one or more other ONUs are ONUs, from among the un-grouped ONUs, excluding the initial ONU selected in operation S530, that have relative signal power levels which differ from a relative signal power level of the initial ONU selected in operation S530 by less than a threshold amount. For example, according to at least some example embodiments, the threshold amount may be 3 decibels (dB), and thus, the OLT 110 may determine, as the one or more other ONUs, every un-grouped ONU having a relative signal power level that differs from the relative signal power level of the initial ONU selected in operation S530 by less than 3 decibels (dB). After determining the one or more other ONUs in operation S530, the OLT 110 may proceed to operation S540.

In operation S540, the OLT 110 assigns the upstream data bursts of the initial ONU determined in operation S520 and the upstream data bursts of the one or more other ONUs determined in operation S530 into upstream data burst group Group i.

Further, according to at least some example embodiments, in operation S540, the OLT 110 may order the upstream data bursts of upstream data burst group Group i such that the upstream data burst of the initial ONU determined in operation S520 is first, and the upstream data bursts of the one or more other ONUs determined in operation S530 follow the upstream data burst of the initial ONU.

Thus, when i=1, the OLT 110 creates a first upstream data burst group Group 1, when i=2, the OLT 110 creates a second upstream data burst group Group 2, and when i=n, the OLT 110 creates a $n^{th}$ upstream data burst group Group n, where n is a positive integer. After operation S540, the OLT 110 proceeds to operation S550.

In operation S550, the OLT 110 determines whether or not any un-grouped ONUs remain. For example, in operation S550, the OLT 110 determines whether upstream data bursts of any of the allocated ONUs identified in operation S420 have not been placed into an upstream data burst group by the OLT 110.

According to at least some example embodiments, it is possible for an initial ONU determined in operation S520 to be a lone ONU, where a lone ONU is an ONU that has a relative signal power level which differs by more than the threshold amount (e.g., 3 decibels (dB)) with respect to the relative signal power levels of all other allocated ONUs. According to at least some example embodiments, when an initial ONU determined in operation S520 is a lone ONU, the OLT 110 may create an upstream data burst group Group i including only the upstream data burst of the initial ONU.

If the OLT 110 determines, in operation S540, that at least one un-grouped ONU remains, the OLT 110 proceeds to operation S560, increments the index value i, and repeats operations S520-S550. If the OLT 110 determines, in operation S540, that no un-grouped ONU remains, the OLT 110 proceeds to operation S440 illustrated in FIG. 4.

Returning to FIG. 4, in operation S440, uplink transmissions of the allocated ONUs identified in operation S420 are scheduled according to the plurality of groups determined in operation S430. For example, the OLT 110 may assign time intervals to the upstream data bursts of the allocated ONUs based on the groups to which the upstream data bursts have been assigned. As is discussed in greater detail below, with reference to FIG. 6, the OLT 110 may assign upstream data bursts belonging to the same upstream data burst group to consecutive time intervals. Further, the order in which time intervals of upstream data bursts belonging to the same upstream data burst group are arranged may correspond to the order determined in operation S540.

Further, as will be discussed in greater detail below with respect to FIG. 5, in operation S540, the OLT 110 may select the time intervals of upstream data bursts belonging to the same upstream data burst group such that an intra-group preamble is shorter than an inter-group preamble, where the intra-group preamble is a preamble between time intervals of consecutive upstream data bursts that belong to the same upstream data burst group, and the inter-group preamble is a preamble between time intervals of consecutive upstream data bursts that belong to different upstream data burst groups. After operation S440, the OLT 110 may proceed to operation S450.

In operation S450, an upstream transmission schedule is provided to the allocated ONUs. For example, according to at least some example embodiment, in operation S450, the OLT 110 communicates the upstream transmission schedule determined in operation S440 to the allocated ONUs in accordance with known methods including, for example, transmitting grants to the allocated ONUs and/or transmitting a downstream bandwidth map to the allocated ONUs. In accordance with known upstream transmissions scheduling methods and/or upstream bandwidth allocation methods, each grant represents permission for the ONU receiving the grant to transmit an upstream data burst during a particular interval of time in accordance with the upstream transmission schedule determined in operation S440.

An example sequence of upstream data bursts scheduled in accordance with the methods described above with reference to FIGS. 1-5 will now be discussed in greater detail below, with reference to FIG. 6.

Figure 6:
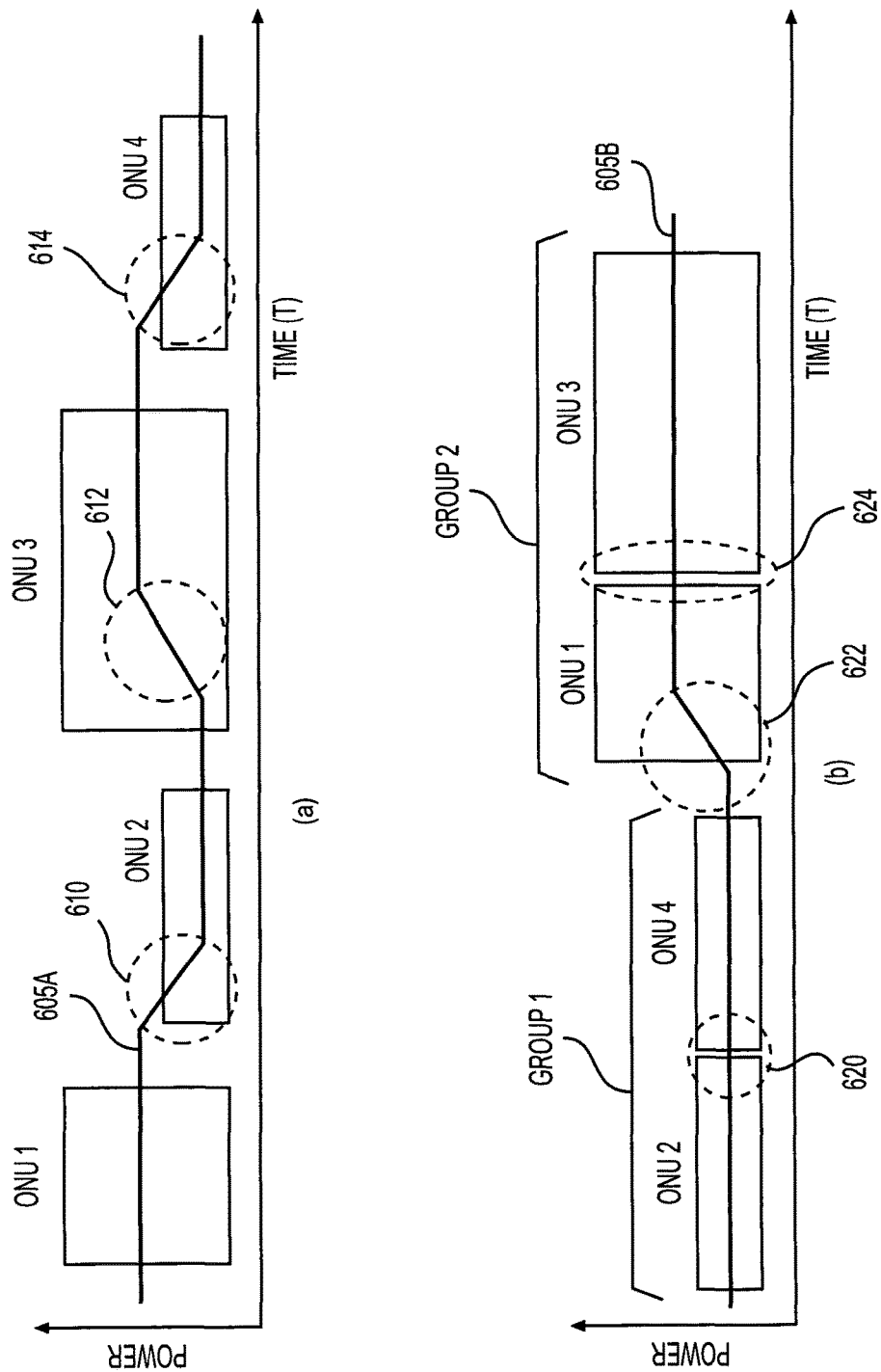
FIG. 6 is a diagram for explaining an example schedule of ONU data bursts according to one or more example embodiments.

FIG. 6 is a diagram for explaining an example schedule of ONU data bursts according to one or more example embodiments. Items (a) and (b) of FIG. 6 both illustrate relative power levels of scheduled upstream data bursts of the first through fourth ONUs ONU1-ONU4 from the perspective of the OLT 110, which is receiving the upstream data bursts of the first through fourth ONUs ONU1-ONU4. The upstream data bursts illustrated in item (a) of FIG. 6 were not scheduled in accordance with the method of reducing preamble lengths discussed above with reference to FIGS. 1-5. The upstream data bursts illustrated in item (b) of FIG. 6 were scheduled in accordance with the method of reducing preamble lengths discussed above with reference to FIGS. 1-5.

Reception levels 605A and 605B each indicate a power levels at which the Rx components of the OLT 110 can accurately and reliably acquire payload data included in an upstream data burst. In the examples illustrated in FIG. 6, the Rx components of the OLT 110 are capable of accurately and reliably acquiring payload data of an upstream data burst when the reception level 605A with respect to item (a) or 605B with respect to item (b) is illustrated as being centered vertically within an upstream data burst.

Referring to item (a) of FIG. 6, periods of time during which the reception level 605A is not centered within an upstream data burst are indicated by diagonal lines, which represent a preamble time, which is a duration of a process of the Rx components of the OLT 110 adjusting from acquiring data of a first input power level to acquiring data of a second input power level as is discussed above with respect to FIG. 3.

As is illustrated in item (a) of FIG. 6, due to the substantial input power level differences that can exist between each pair of upstream data bursts, three substantial preamble periods 610, 612, and 614 exist within the schedule of the upstream data bursts illustrated in item (a) of FIG. 6. As is discussed above, with respect to FIG. 3, the preambles 610, 612, and 614 correspond to periods of time during which the second through fourth ONUs ONU2-ONU4 are ready to transmit payload data to the OLT 110, but do not because the OLT 110 is not ready to receive the payload data reliably and accurately.

Referring to item (b) of FIG. 6, because the upstream data bursts of the first through fourth ONUs ONU1-ONU4 illustrated in item (b) of FIG. 6 were scheduled, in accordance with the method of reducing preamble lengths discussed above with reference to FIGS. 1-5, there are fewer instances of large power differences between pairs of consecutive upstream data bursts. For example, as is illustrated in item (b) of FIG. 6, the upstream data bursts of the first through fourth ONUs ONU1-ONU4 have been arranged into a first group Group 1, and a second group Group 2 on the basis of signal power levels of the first through fourth ONUs ONU1-ONU4. Thus, an amount of time taken by the Rx components of the OLT 110 to adjust between receiving the upstream data bursts of the second and fourth ONUs ONU2 and ONU 4 may be greatly reduced. For example, the Rx setting time 350 and the RX AGC time 340 described above with reference to FIG. 3 may be significantly reduced or, alternatively, eliminated between upstream data bursts belonging to the same upstream data burst group (e.g., the second and fourth ONUs ONU2 and ONU4 of Group 1, and the first and third ONUs ONU1 and ONU3 of Group 2). Consequently, lengths of the preambles between upstream data bursts belonging to the same upstream data burst group may be significantly reduced, as is shown with respect to preamble 620 between the upstream data bursts of the second and fourth ONUs ONU2 and ONU4, and the preamble 624 between the upstream data bursts of the first and third ONUs ONU1 and ONU3. Due to the input power level change that exists between the upstream data bursts of Group 1 and the upstream data bursts of Group 2, a larger preamble 622 is still included in between the upstream data bursts of the fourth ONU ONU4 and the first ONU ONU 1.

Thus, as is discussed above with respect to operation S440 of FIG. 4 and illustrated in FIG. 6, according to at least some example embodiments, the OLT 110 may select the time intervals of upstream data bursts belonging to the same upstream data burst group such that an intra-group preamble (i.e., preamble 620 and preamble 624) is shorter than an inter-group preamble (i.e., preamble 622), where the intra-group preamble is a preamble between time intervals of consecutive upstream data bursts that belong to the same upstream data burst group, and the inter-group preamble is a preamble between time intervals of consecutive upstream data bursts that belong to different upstream data burst groups.

Thus, as is illustrated in FIG. 6, by implementing the method of reducing preamble lengths discussed above with reference to FIGS. 1-5, the achievable bandwidth of upstream data transmissions in the PON 101 may be increased by increasing the ratio between (i) the amount of time during which payload data can be accurately and reliably received at the OLT 110 from an ONU, and (ii) the amount time during which payload data cannot be accurately and reliably received at the OLT 110 from an ONU.

Example schemes for handling an event in which an ONU is prevented from transmitting during a timeslot assigned to the ONU will now be discussed in greater detail below with reference to FIGS. 7A-C.

Figure 7A:
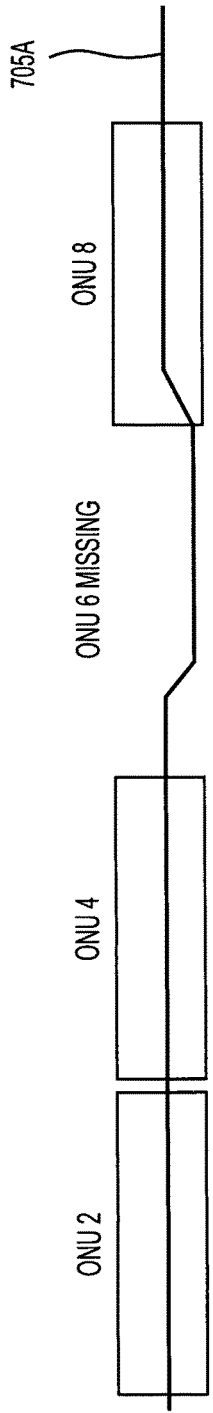
FIGS. 7A-C are diagrams for explaining example schemes for handling missing bursts, according to at least some example embodiments.
Figure 7B:
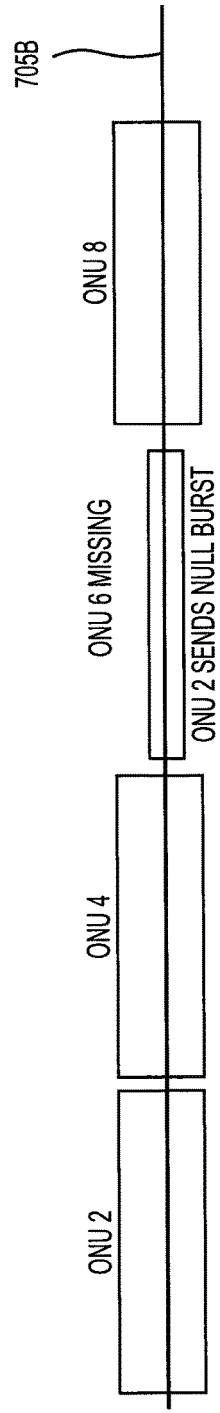
Figure 7C:
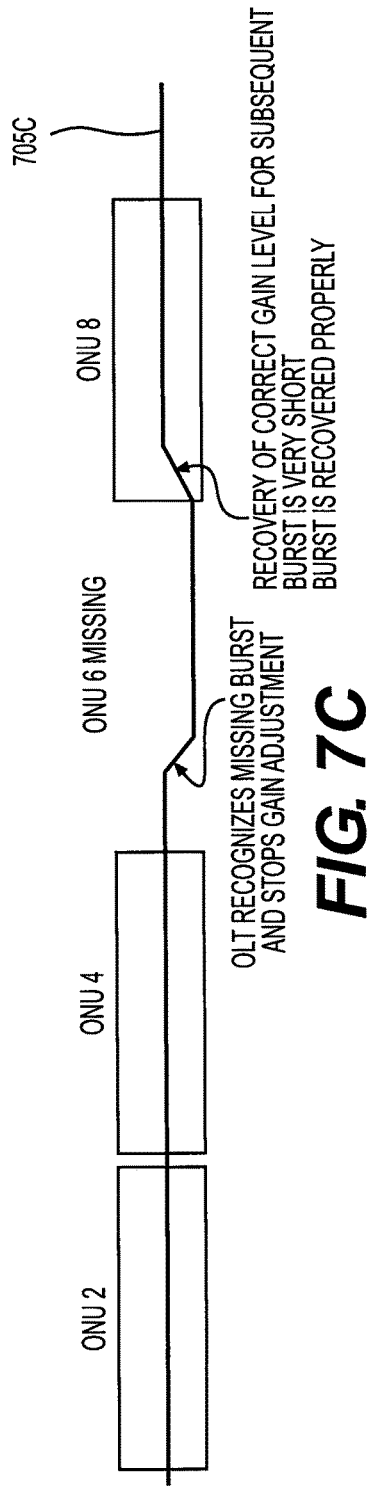

FIGS. 7A-C are diagrams for explaining example schemes for handling missing bursts, according to at least some example embodiments. An ONU may experience an error condition (such as power loss) that prevents the ONU from transmitting during the ONU's assigned timeslot. An event in which an ONU does not transmit during an assigned timeslot in such a manner is known as a missing burst. As preambles become shorter, the chances of a missing burst resulting in a subsequent burst of a next ONU scheduled to transmit upstream data not being recovered properly by the OLT 110 increase. FIGS. 7A-C each illustrate scenarios in which the OLT 110 has scheduled bursts for second, fourth, sixth and eighth ONUs ONU2, ONU4, ONU6 and ONU8, and the sixth ONU6 experiences an error that causes a missing burst (i.e., the sixth ONU ONU6 does not transmit a data burst during the timeslot assigned to the sixth ONU ONU6 by the OLT 110).

FIG. 7A shows a reception 705A that occurs, due to the missing burst of the sixth ONU ONU6, when no protection scheme is employed. As is shown in FIG. 7A, the OLT 110 may need to perform a substantial adjustment in order to attempt to properly recover the data burst of the eighth ONU ONU 8, and thus, the chances of the OLT 110 recovering the data burst of the eighth ONU ONU 8 improperly (e.g., losing the data burst of the eighth ONU ONU 8) increase.

FIGS. 7B and 7C are diagrams illustrating example protection schemes for preventing the loss of a subsequent burst. In FIG. 7B, the second ONU ONU2 is directed by the OLT 100 to burst an unmodulated signal during the timeslot previously assigned to the sixth ONU ONU6. According to at least some example embodiments, the unmodulated signal contains no data and is an ONU null packet that includes either a burst of all logical "1" or logical "0". This ONU null packet prevents the OLT 110 from adjusting a gain of the OLT 110 due to the missing burst, thereby allowing for proper reception of the subsequent burst (i.e., the burst of the eighth ONU ONU8) at the OLT 110.

Though FIG. 7B is described above with reference to an example scenario in which the second ONU ONU2 provides the unmodulated signal, according to at least some example embodiments, the unmodulated signal may be provided by a different ONU, for example, the fourth ONU ONU4. For example, according to at least some example embodiments, every ONU in the PON 101 is configured to transmit the unmodulated signal (i.e., the ONU null packet) during the timeslot immediately following the timeslot in which the ONU transmits a data burst, and thus, after every successful transmission of a data burst, a significant change in the gain of the OLT 110 may be prevented even when a missing burst occurs after a successful transmission of a data burst. Alternatively, according to at least some example embodiments, the OLT 110 is configured to control any or all allocated ONUs to transmit the unmodulated signal (i.e., the ONU null packet) during the timeslot immediately following a timeslot during which the allocated ONUs transmit a data burst.

FIG. 7C shows a protection scheme in which an optic module of the OLT 110 includes circuitry configured to disable or clamp the automatic gain control. According to at least some example embodiments, in the example shown in FIG. 7C, the OLT 110 is configured to recognize the occurrence of a missing burst, and, in response to recognizing the occurrence of the missing burst, direct the optics module to maintain the current gain setting.

Example embodiments being thus described, it will be obvious that embodiments may be varied in many ways. Such variations are not to be regarded as a departure from example embodiments, and all such modifications are intended to be included within the scope of example embodiments.

What is claimed:
1. A method of handling upstream data transmissions in a passive optical network, the method comprising:
    determining signal power levels of a plurality of optical network units (ONUs); and
    scheduling transmissions of upstream data bursts of the plurality of ONUs by,
        assigning each of the upstream data bursts to one of two or more data burst groups based on the determined signal power levels, and
        selecting time intervals during which the upstream data bursts are transmitted in accordance with the two or more data burst groups such that the two or more data burst groups are scheduled to be transmitted sequentially,
    wherein the scheduling of the transmissions of the upstream data bursts includes scheduling of the transmissions of the upstream data bursts such that a length of an intra-group preamble is different than a length of an inter-group preamble,
        the intra-group preamble being a preamble between time intervals of two consecutive upstream data bursts that belong to a same data burst group from among the two or more data burst groups,
        the inter-group preamble being a preamble between time intervals of two consecutive upstream data bursts that belong to two different data burst groups, respectively, from among the two or more data burst groups.

2. The method of claim 1, wherein the length of the intra-group preamble is less than the length of the inter-group preamble.

3. The method of claim 1, wherein the determining of the signal power levels of the plurality of ONUs comprises:
    sending ranging requests to the plurality of ONUs;
    receiving ranging responses from the plurality of ONUs; and
    measuring signal power levels of the received ranging responses.

4. The method of claim 3, wherein the determining of the signal power levels of the plurality of ONUs further comprises:
    for each ONU among the plurality of ONUs,
        determining the signal power level of the ONU to be the measured signal power level of the ranging response received from the ONU.

5. The method of claim 4, wherein the measuring of the signal power levels of the received ranging responses is based on received signal strength indicators (RSSIs) of the received ranging responses.

6. The method of claim 1, wherein the assigning comprises:
    determining an initial ONU from among the plurality of ONUs;
    determining one or more other ONUs from among the plurality of ONUs, the one or more other ONUs being ONUs, from among the plurality of ONUs, whose determined signal power levels differ from the determined signal power level of the initial ONU by less than a threshold amount; and
    assigning the data bursts, from among the upstream data bursts, of the initial ONU and the one or more other ONUs to a same data burst group, from among the two or more data burst groups.

7. The method of claim 6, wherein the determining of the initial ONU comprises:
    determining a plurality of priority categories corresponding to the plurality of ONUs by determining, for each ONU among the plurality of ONUs, a priority category to which the ONU belongs; and
    determining, as the initial ONU, an ONU, from among the plurality of ONUs, that belongs to a highest priority category from among the plurality of priority categories.

8. The method of claim 1 further comprising:
    controlling at least one ONU, from among the plurality of ONUs, to transmit a null packet during a timeslot following a timeslot in which the at least one ONU transmits an upstream data packet.

9. The method of claim 8, wherein the null packet is an unmodulated signal including all logical 1 values or all logical 0 values.

10. A passive optical network (PON) element comprising:
    memory storing computer-executable instructions; and
    one or more processors configured to execute the computer-executable instructions such that the one or more processors are configured to, determine signal power levels of a plurality of optical network units (ONUs); and schedule transmissions of upstream data bursts of the plurality of ONUs by, assigning each of the upstream data bursts to one of two or more data burst groups based on the determined signal power levels, and selecting time intervals during which the upstream data bursts are transmitted in accordance with the two or more data burst groups such that the two or more data burst groups are scheduled to be transmitted sequentially, wherein the one or more processors are configured to execute the computer-executable instructions such that scheduling of the transmissions of the upstream data bursts includes scheduling of the transmissions of the upstream data bursts such that a length of an intra-group preamble is different than a length of an inter-group preamble, the intra-group preamble being a preamble between time intervals of two consecutive upstream data bursts that belong to a same data burst group from among the two or more data burst groups, the inter-group preamble being a preamble between time intervals of two consecutive upstream data bursts that belong to two different data burst groups, respectively, from among the two or more data burst groups.

11. The PON element of claim 10, wherein the one or more processors are configured to execute the computer-executable instructions such that the length of the intra-group preamble is less than the length of the inter-group preamble.

12. The PON element of claim 10, wherein the one or more processors are configured to execute the computer-executable instructions such that the determining of the signal power levels of the plurality of ONUs comprises:

sending ranging requests to the plurality of ONUs;

receiving ranging responses from the plurality of ONUs; and measuring signal power levels of the received ranging responses.

13. The PON element of claim 12, wherein the one or more processors are configured to execute the computer-executable instructions such that the determining of the signal power levels of the plurality of ONUs further comprises:

for each ONU among the plurality of ONUs, determining the signal power level of the ONU to be the measured signal power level of the ranging response received from the ONU.

14. The PON element of claim 13, wherein the one or more processors are configured to execute the computer-executable instructions such that the measuring of the signal power levels of the received ranging responses is based on received signal strength indicators (RSSIs) of the received ranging responses.

15. The PON element of claim 10, wherein the one or more processors are configured to execute the computer-executable instructions such that the assigning comprises:

determining an initial ONU from among the plurality of ONUs;

determining one or more other ONUs from among the plurality of ONUs, the one or more other ONUs being ONUs, from among the plurality of ONUs, whose determined signal power levels differ from the determined signal power level of the initial ONU by less than a threshold amount; and assigning the data bursts, from among the upstream data bursts, of the initial ONU and the one or more other ONUs to a same data burst group, from among the two or more data burst groups.

16. The PON element of claim 15, wherein the one or more processors are configured to execute the computer-executable instructions such that the determining of the initial ONU comprises:

determining a plurality of priority categories corresponding to the plurality of ONUs by determining, for each ONU among the plurality of ONUs, a priority category to which the ONU belongs; and determining, as the initial ONU, an ONU, from among the plurality of ONUs, that belongs to a highest priority category from among the plurality of priority categories.

17. The PON element of claim 10 wherein the one or more processors are configured to execute the computer-executable instructions such that the one or more processors are further configured to, control at least one ONU, from among the plurality of ONUs, to transmit a null packet during a timeslot following a timeslot in which the at least one ONU transmits an upstream data packet.

18. The PON element of claim 17, wherein the null packet is an unmodulated signal including all logical 1 values or all logical 0 values.

* * * * *